United States Patent [19]
Ruhl et al.

[11] Patent Number: 5,567,398
[45] Date of Patent: Oct. 22, 1996

[54] ENDOTHERMIC REACTION APPARATUS AND METHOD

[75] Inventors: Robert C. Ruhl, Cleveland Heights; Ralph A. Felice, Macedonia, both of Ohio

[73] Assignee: The Standard Oil Company, Cleveland, Ohio

[21] Appl. No.: 78,748

[22] Filed: Jun. 16, 1993

Related U.S. Application Data

[63] Continuation-in-part of Ser. No. 888,776, May 26, 1992, abandoned, and Ser. No. 889,035, May 26, 1992, abandoned, which is a continuation-in-part of Ser. No. 810,251, Dec. 19, 1991, abandoned, and Ser. No. 810,237, Dec. 19, 1991, abandoned, which is a continuation-in-part of Ser. No. 504,375, Apr. 3, 1990, abandoned, said Ser. No. 810,251, is a continuation-in-part of Ser. No. 504,375.

[51] Int. Cl.⁶ .................................................. B01J 8/06
[52] U.S. Cl. .................. 422/197; 422/202; 422/204; 422/312; 48/127.9; 48/94
[58] Field of Search .................. 422/197, 200, 422/201, 202, 204, 211, 212, 146, 312; 48/127.9, 127.7, 94, 197 R, 198.1, 198.6, 198.7, 214 D, 214 R; 165/83, 108; 252/373; 423/652, 654, 650, 651, 653

[56] References Cited

U.S. PATENT DOCUMENTS

| | | |
|---|---|---|
| 1,934,836 | 11/1933 | Wietzel et al. . |
| 1,959,151 | 5/1934 | Beekley . |
| 2,018,619 | 10/1935 | Winkler et al. . |
| 2,039,603 | 5/1936 | Maier . |
| 2,291,762 | 8/1942 | Samans . |
| 2,294,430 | 9/1942 | Thayer . |
| 2,336,879 | 12/1943 | Mekler .................................. 257/224 |
| 2,483,132 | 9/1949 | Gaucher . |
| 2,491,518 | 12/1949 | Riblett . |
| 2,569,846 | 10/1951 | Cornell . |
| 2,683,152 | 7/1954 | Dickinson . |
| 2,862,984 | 12/1958 | Bartholome et al. . |
| 2,933,291 | 4/1960 | Huggins . |
| 2,987,382 | 6/1961 | Endter et al. . |
| 3,132,010 | 5/1964 | Dwyer et al. . |
| 3,215,502 | 11/1965 | Korwin . |
| 3,264,066 | 8/1966 | Quartulli et al. . |
| 3,382,044 | 5/1968 | Cromeans . |
| 3,531,263 | 9/1970 | Sederquist .................................. 48/61 |
| 3,541,729 | 11/1970 | Dantowitz . |
| 3,850,231 | 11/1974 | Creek . |
| 3,909,299 | 11/1975 | Corrigan . |
| 3,950,463 | 4/1976 | Jones . |
| 4,098,588 | 7/1978 | Buswell et al. . |
| 4,124,667 | 11/1978 | Coppola et al. . |
| 4,144,207 | 3/1979 | Ohnsorg . |
| 4,157,241 | 6/1979 | Samuelson . |

(List continued on next page.)

FOREIGN PATENT DOCUMENTS

| | | |
|---|---|---|
| 033128 | 8/1981 | European Pat. Off. . |
| 0247384 | 12/1987 | European Pat. Off. . |
| 0314408 | 5/1989 | European Pat. Off. ............... 422/197 |
| 0399833 | 11/1990 | European Pat. Off. . |
| 450872 | 10/1991 | European Pat. Off. . |
| 702776 | 4/1931 | France . |
| 2331374 | 6/1977 | France . |
| 58-026002 | 2/1983 | Japan . |
| 1039756 | 8/1966 | United Kingdom . |
| 2050413 | 1/1981 | United Kingdom . |

*Primary Examiner*—Peter Kratz
*Attorney, Agent, or Firm*—Renner, Otto, Boisselle & Sklar

[57] ABSTRACT

A compact endothermic reaction apparatus employing metallic reaction tubes in a close-pack arrangement using offset nozzle tubes and an air distribution plate for introducing fuel and air into a combustion chamber to produce long and thin flames thereby to avoid excessive localized heating of the reaction tubes and provide high reaction tube life expectancy. Also, excessive localized heating of the reaction tubes at the inlet ends of exhaust tubes is eliminated and provision is made for preventing buckling of individual reaction tubes that may be subjected to higher than average reaction tube temperatures.

29 Claims, 6 Drawing Sheets

U.S. PATENT DOCUMENTS

| | | |
|---|---|---|
| 4,161,510 | 7/1979 | Edridge . |
| 4,179,299 | 12/1979 | Coppola et al. . |
| 4,207,226 | 6/1980 | Storm . |
| 4,221,763 | 9/1980 | Greene . |
| 4,224,298 | 9/1980 | Robinson ................................ 423/359 |
| 4,233,256 | 11/1980 | Ohnsorg . |
| 4,265,843 | 5/1981 | Dias et al. . |
| 4,266,600 | 5/1981 | Bieberbach . |
| 4,312,954 | 1/1982 | Coppola et al. . |
| 4,346,049 | 8/1982 | Coppola et al. . |
| 4,692,306 | 4/1987 | Minet . |
| 4,714,593 | 12/1987 | Naito et al. . |
| 4,746,329 | 5/1988 | Christner et al. . |
| 4,810,472 | 3/1989 | Andrew et al. . |
| 4,849,187 | 7/1989 | Uozu et al. . |
| 4,861,347 | 8/1989 | Szyolowski et al. . |
| 4,861,348 | 8/1989 | Koyama et al. . |
| 4,909,808 | 3/1990 | Voecks . |
| 4,946,667 | 8/1990 | Beshty . |
| 5,106,590 | 4/1992 | Hopper et al. ........................ 422/198 |
| 5,264,008 | 11/1993 | Corrigan ................................ 48/127.9 |
| 5,283,049 | 2/1994 | Fluder et al. ........................ 422/197 |

ENDOTHERMIC REACTION APPARATUS AND METHOD

CROSS-REFERENCE TO RELATED APPLICATIONS

This application is a continuation-in-part of application Ser. Nos. 07/888,776 and 07/889,035, both filed on May 26, 1992, which are continuations-in-part of application Ser. Nos. 07/810,251 and 07/810,237, both filed Dec. 19, 1991, both of which are continuations-in-part of application Ser. No. 07/504,375 filed Apr. 3, 1990 (all now abandoned). The disclosures of the aforesaid applications are hereby incorporated herein by reference in their entireties.

BACKGROUND OF THE INVENTION

1. Field of the Invention

The present invention relates to apparatus and methods used in conducting endothermic reactions and, in particular, to catalytic reforming apparatus and methods for reforming light hydrocarbons and especially mixtures of steam and/or carbon dioxide and light hydrocarbons.

2. Description of the Prior Art

Reforming apparatus and methods heretofore have been used to conduct a variety of endothermic reactions. For example, steam reforming is an established process for converting natural gas and other hydrocarbons into synthesis gas which is commonly referred to as syngas. Another endothermic reaction is the conversion (pyrolysis) of ethane to ethylene which also produces the by-product hydrogen. Depending upon the endothermic reaction, a catalyst may or may not be needed. A catalyst useful for steam reforming of hydrocarbons is nickel on an inert support, such as alumina.

Many commercial steam reformers are of a radiant-type that employs catalyst-filled reaction tubes. These reformers are indirectly heated with a relatively small number of large burners fed by fuel gas and low-pressure air. In the hottest section, heat transfer is primarily by gas radiation, supplemented by refractory radiation and convection. Uniform radiation to the reaction tubes has been reported to be critical since excessive local heating of a reaction tube wall will result in diminished life expectancy for the reformer tubes. To avoid excessive localized heating, a solution has been to provide large spacings between the reaction tubes, the furnace walls, and the burner flames. Consequently, these radiant reformers have been large and expensive on a per unit of capacity basis. They also usually require additional heat exchangers to cool the syngas product and to preheat the feed gas. Generally, the operational principles associated with these prior art radiant reformers do not lend themselves to a relatively low cost, efficient and compact design coupled with long reaction tube life expectancy.

Various attempts have been made to provide an endothermic reaction apparatus that achieves the objects of compact design and long life expectancy. In U.S. Pat. No. 4,692,306, these objects are said to be accomplished by a novel burner chamber configuration which prevents flame impingement or direct line-of-sight between burner flame and reaction chamber.

Accordingly, much conventional thinking has been directed away from direct flame impingement on reaction tubes in prior art endothermic reaction apparatus, primarily because of the excessive localized heating of the reaction tubes that arises from direct flame impingement using conventional burner designs.

RELATED PRIOR PUBLISHED APPLICATION

In published European Patent Application No. 0 450 872 A1, corresponding to U.S. patent application Ser. No. 07/504,375, there is described an endothermic reaction apparatus for carrying out various types of endothermic reactions. The apparatus comprises a vessel containing a catalyst bed through which a plurality of ceramic combustion tubes pass. Air and fuel, which are separately supplied to the combustion tube and a fuel feed pipe inside the combustion tube, are combusted inside the combustion tube to generate heat. Preferably, the fuel and air are preheated to achieve autoignition when the fuel and air are combined within the combustion tube. An endothermic reactant is fed through the catalyst bed outside the combustion tube where it is converted to produce an endothermic product. As disclosed, the endothermic reactant and endothermic product preferably flow through the catalyst bed counter-currently with respect to the flow of exothermic reactants and reaction products, i,e., the fuel, air and combustion products. In this arrangement a preheat zone is provided within the reaction vessel wherein heat is transferred to the separately fed air and fuel from the endothermic product for preheating the air and fuel prior to combustion and for cooling the endothermic product prior to exiting the reaction vessel.

The foregoing and other endothermic reaction apparatus disclosed in said earlier published European patent application have many advantages. Ceramic tubes can withstand the very high temperatures encountered in many endothermic reactions better than most metals. Ceramic tubes can also be made stronger and hence thinner by an externally applied compressive stress, either by mechanical means such as clamping the opposite ends of the tubes, or by increasing the pressure on the outside surfaces of the tubes where the endothermic reaction takes place, or both. Unfortunately, ceramic tubes are subject to thermal stress problems, especially if they are too thick. Ceramic tubes also are relatively difficult and costly to fabricate, and careful attention must be paid to the fact that ceramic tubes are relatively brittle when compared to metal tubes.

RELATED UNPUBLISHED APPLICATIONS

The foregoing endothermic reaction apparatus and associated method are also described in copending U.S. patent application Ser. Nos. 07/810,237 and 07/888,776. The '237 and '776 applications also describe another embodiment of an endothermic reaction furnace and associated method, which other embodiment is also described in copending application Ser. Nos. 07/810,251 and 07/889,035.

In this other embodiment, the endothermic reaction occurs inside one or more metallic reaction tubes while the exothermic, i.e., heat generating, reaction occurs outside the reaction tubes. As is preferred, the flow paths of the reaction components, on the one hand, and the combustion components, on the other hand, are arranged so that separately fed air and combustion fuel are heated above their autoignition temperature before being combined by heat transfer from the endothermic product, which thereby is correspondingly cooled before exiting the reaction vessel. The inside and outside wall temperatures of the reaction tubes are maintained at acceptably low levels even though the flame temperature of the combustion gases reaches a very high level. This enables use of metallic rather than ceramic tubes while still obtaining high reaction and thermal efficiencies. Also, autoignition of the combustion gases eliminates the need for separate ignition devices and/or burner structures to initiate and/or stabilize combustion. By eliminating the need for these devices and allowing direct flame impingement on the reaction tubes, close packing of the reaction tubes in a multi-tube reforming apparatus may be achieved.

SUMMARY OF THE INVENTION

The present invention provides further improvements in the design and operation of endothermic reaction apparatus and especially those of the type employing metallic reaction tubes in a close-pack arrangement, such as the above described metallic tube embodiment of the related unpublished U.S. applications, as well as in other types of endothermic reaction apparatus. The herein described invention lends itself to the provision of a compact endothermic reaction apparatus of relatively low cost when compared to the above described commercial radiant reformers. Also, according to a preferred embodiment of the invention, direct flame impingement on the reaction tubes is optimized to attain high efficiency in a compact bundle of reaction tubes while still providing high reaction tube life expectancy. Also, according to other aspects of the invention, excessive localized heating of the reaction tubes at the inlet ends of exhaust tubes is eliminated and special provision is made for preventing buckling of individual reaction tubes that may be subjected to higher than average reaction tube temperatures. As will be appreciated, the hereinafter described features of the invention may be employed alone or in combination with one or more of the inventive features to obtain improved performance and efficiencies at relatively low cost when compared to prior art radiant reformers.

According to one aspect of the invention, an endothermic reaction apparatus for effecting an endothermic reaction, comprises a vessel including an inlet port for an endothermic reactant to be subjected to an endothermic reaction to convert the reactant to an endothermic product, an outlet port for the endothermic product, and an exothermic reaction chamber. At least one reaction tube, which provides a flow passage between the inlet and outlet ports, extends through the exothermic reaction chamber. First and second supplies are provided (preferably interiorly of the vessel) for separately supplying first and second exothermic reaction fluids to the exothermic reaction chamber for reacting within the exothermic reaction chamber and for providing flow of exothermic reaction products in a direction going from an upstream end to a downstream end of the exothermic reaction chamber. The first supply has a first fluid outlet means for introducing the first fluid into the exothermic reaction chamber at the upstream end thereof in such a manner to provide a substantially uniform velocity profile across the chamber, and the second supply includes second fluid outlet means for introducing the second fluid into the exothermic reaction chamber at or downstream of the first fluid outlet means and at a plurality of discrete locations adjacent but laterally offset (and preferably spaced) from the reaction tube or tubes, whereby the second fluid exiting from the second fluid outlet means combines with the first fluid for generation of high temperature flames around the reaction tube or tubes downstream of the second fluid outlet means and high temperature exothermic reaction products for flow around and along the reaction tube or tubes, for heating the reaction tube or tubes to support an endothermic conversion of the endothermic reactant to the endothermic product as it flows through the reaction tube or tubes. This arrangement enables the production of elongated flames extending a substantial distance along the length of the reaction tube and thereby avoiding high heat concentrations that otherwise arise from short flames.

In a preferred embodiment, the first fluid outlet means includes a flow distribution member extending transversely of the reaction tube or tubes and having a plurality of openings through which the first fluid flows into the upstream end of the exothermic reaction chamber. The first supply also may include a first fluid plenum chamber on the side of the distribution member opposite the exothermic reaction chamber. The second fluid outlet means preferably includes a plurality of nozzle tubes projecting from the distribution member into the exothermic reaction chamber generally parallel to and laterally offset from the reaction tube or tubes. The second supply may include a second fluid plenum chamber to which the plurality of nozzle tubes are connected, the second fluid plenum being on the side of the first fluid plenum opposite the exothermic reaction chamber.

The foregoing features have particular application in an endothermic reaction apparatus wherein the reaction tube or tubes each has a downstream portion disposed downstream of the exothermic reaction chamber in the direction of flow of endothermic product to the outlet port, the first supply including a first supply tube through which the downstream portion of the reaction tube coextends, the first supply tube and the reaction tube forming therebetween a first fluid flow passage in heat exchange relationship (preferably counter-current) with the downstream portion of the reaction tube, the second supply including a second supply tube through which the first supply tube coextends, and the first and second supply tubes forming therebetween a second fluid flow passage in heat exchange relationship (preferably cocurrent) with the first fluid flow passage which is in heat exchange relationship (preferably counter-current) with the downstream portion of the reaction tube. The first and second fluid flow passages are connected to the first fluid and second fluid plenums, respectively.

For those endothermic reactions wherein a catalyst is used, an endothermic reaction catalyst is contained within the reaction tube or tubes, primarily in the region of the exothermic reaction chamber, and optionally throughout the tube in the vessel, while inert media, such as ceramic balls, may elsewhere be used in the tube or tubes to promote high heat exchange or transfer rates especially downstream of the flow distribution member and immediately on entry of the endothermic reactant into the reaction vessel from the inlet port.

In multiple reaction tube embodiments, the nozzle tubes preferably are substantially uniformly dispersed among the plurality of reaction tubes. The nozzle tubes preferably have outlet ends oriented to direct the second fluid exiting therefrom in a direction substantially parallel to the reaction tubes. At least a plurality of the nozzle tubes may have associated therewith a flow restricting orifice for equalizing flow through the nozzle tubes which preferably are fed from a common plenum.

According to a further aspect of the invention, an endothermic reaction apparatus for effecting an endothermic reaction, comprises a vessel including an inlet port for an endothermic reactant to be subjected to an endothermic reaction to convert the reactant to an endothermic product, an outlet port for the endothermic product, and an exothermic reaction chamber. At least one reaction tube, which provides a flow passage between the inlet and outlet ports, extends through the exothermic reaction chamber. First and second supplies are provided (preferably interiorly of the vessel) for separately supplying pressurized first and second exothermic reaction fluids to the exothermic reaction chamber for reacting within the exothermic reaction chamber and for providing flow of exothermic reaction products in a direction going from an upstream end to a downstream end of the exothermic reaction chamber. The first supply has a first fluid outlet means for introducing the first fluid into the exothermic reaction chamber at the upstream end thereof, and the second supply includes a plurality of discrete outlets, preferably in the form of nozzle tubes, that are laterally offset and preferably laterally spaced apart from the reaction tube or tubes for directing the second fluid into the exothermic reaction chamber at respective locations adjacent but laterally offset from the reaction tube or tubes, whereby the second fluid exiting from the second fluid outlet means combines with the first fluid for generation of high temperature flames around the reaction tube or tubes downstream of the second fluid outlet means and high temperature exothermic reaction products for flow around and along the reaction tube or tubes, for heating the reaction tube or tubes to support an endothermic conversion of the endothermic reactant to the endothermic product as it flows through the reaction tube or tubes. This arrangement enables the production of elongated flames extending a substantial distance along the length of the reaction tube and thereby avoiding high heat concentrations that otherwise arise from short flames.

According to another aspect of the invention, provision is made for preventing excessive localized heating of the reaction tube or tubes when an exhaust tube is employed to cause the exothermic reaction products exiting from the exothermic reaction chamber to flow around and along an upstream portion of a respective reaction tube at a velocity substantially greater than the velocity of the exothermic reaction products through the exothermic reaction chamber. The higher flow velocity enhances heat transfer from the exothermic reaction products to the upstream portion of the reaction tube for heating the endothermic reactant flowing through the upstream portion of the reaction tube and simultaneously cooling the exothermic reaction products prior to exiting the vessel. The exhaust tube through which the upstream portion of a respective reaction tube coextends forms with upstream portion of the reaction tube an exhaust passage for the exothermic reaction products, and the exhaust tube has an inlet end portion configured to provide for a progressive increase of the flow velocity of the exothermic reaction products entering into the exhaust tube thereby to avoid excessive localized heat concentrations in the reaction tube and exhaust tube at the inlet end of the exhaust tube. In a preferred embodiment of the invention, such progressive increase in flow velocity is accomplished by radially outwardly flaring the inlet end portion of the exhaust tube away from the reaction tube.

According to still another aspect of the invention, an endothermic reaction apparatus for effecting an endothermic reaction, comprises a vessel having a longitudinal axis and including an inlet manifold for an endothermic reactant to be subjected to an endothermic reaction to convert the reactant to an endothermic product, and an outlet manifold for the endothermic product. A bundle of longitudinally extending reaction tubes provide a flow passage between the inlet and outlet manifolds, and the reaction tubes are laterally spaced apart and extend through an exothermic reaction chamber within the vessel. The reaction tubes are connected at opposite ends to respective tube sheets or the equivalent, and exothermic reaction means are provided for heating the reaction tubes to support an endothermic conversion of the endothermic reactant to an endothermic product as it flows through the reaction tubes. The inlet and outlet manifolds are disposed in the vessel for relative longitudinal movement for permitting collective expansion and contraction of the bundle of reaction tubes, and each individual tube is connected at one end thereof by an expansion joint to one of the tube sheets to accommodate expansion and contraction of each individual tube relative to collective expansion and contraction of the plurality of reaction tubes. Preferred expansion joints or devices are metal bellows. More particularly, and according to a preferred embodiment, the vessel has an inlet port for the endothermic reactant and an outlet port for the endothermic product, and one of the inlet and outlet ports is connected to a respective one of the inlet and outlet manifolds by a primary metal bellows, and the expansion joint for each reaction tube includes a secondary metal bellows having an expansion/contraction range substantially less than the expansion/contraction range of the primary metal bellows.

The invention also provides new processes for carrying out an endothermic reaction in an endothermic reaction apparatus in which an endothermic reactant is heated by exothermic reaction of two fluids to thereby convert the reactant into an endothermic product, the details of which are set forth in the following detailed description.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

As used herein, "endothermic reactant" means a fluid stream which will be undergoing an endothermic reaction and may be a single component or a mixture of components. Also, "endothermic product" herein means the fluid stream resulting from said endothermic reaction and typically will be a mixture of components such as syngas.

Referring now in detail to the drawings and initially to FIGS. 1A–1D and 2, an endothermic reaction vessel constructed in accordance with the invention is generally indicated by reference numeral 10. The endothermic reaction apparatus 10 comprises a substantially closed reaction vessel 11 which preferably is vertically oriented as illustrated in FIGS. 1A–1D, although it may be otherwise oriented such as, for example, horizontally.

The vessel 11 is formed by a vertically elongated tubular shell 12 which is closed at its ends by an upper end closure 13 and a lower end closure 14. To facilitate assembly, maintenance and repair, the upper and lower end closures 13 and 14 are detachably secured, respectively, to the upper and lower ends of the shell 12 by suitable means. In the illustrated embodiment, the upper end of the shell 12 and the lower end of the upper end closure 13 are provided with mounting flanges 15 and 16, respectively, which are connected together by fasteners 17. Similarly, the lower end of the shell 12 and upper end of the bottom end closure 14 are provided with mounting flanges 18 and 19, which are connected by fasteners 20. As seen in FIG. 1D, a suitable gasket 21 is sandwiched between the mounting flanges 18 and 19 to seal the joint between the shell and bottom end closure against leakage. The joint between the shell and the upper end closure also is sealed against leakage in a manner that is hereinafter described. In the illustrated embodiment, the shell 12 preferably is cylindrical and thus of circular cross-section, although other cross-sectional shapes may also be utilized such as square, hexagonal, etc. The upper and lower end closures may also take various forms, although a dome shape is utilized in the illustrated embodiment of the invention, as is preferred.

The shell 12 and end closures 13 and 14 are preferably made of metal, and more particularly, of steel or alloy steel.

The apparatus 10 may be of considerable length. By way of example, the illustrated apparatus may have an overall length on the order of about 25 feet. In FIGS. 1A–1D, a long section of the apparatus between FIGS. 1B and 1C has been omitted as such section essentially forms a continuation of the illustrated structure bounding the same. Because of the typically long lengths that are involved, the apparatus 10 may be suspended from external support structure at a point near its upper end. For this purpose, the shell 12 has secured thereto a hanger structure 25 which extends radially outwardly for mounting to external support structure at a suitable elevation allowing the vessel for the most part to hang freely to facilitate the removal of the bottom end closure 14 when needed.

The reaction vessel 11 houses a bundle of reaction tubes 28. As shown, the reaction tubes 28 are straight and parallel to the longitudinal axis 29 of the vessel 11. Although the invention will normally be practiced using a plurality of reaction tubes, it may be practiced using even a single reaction tube. In the illustrated embodiment, 19 reaction tubes are provided. However, for most commercial purposes, there usually will be at least about 100 reaction tubes depending upon the quantity of product fluid required.

Figure 1A:
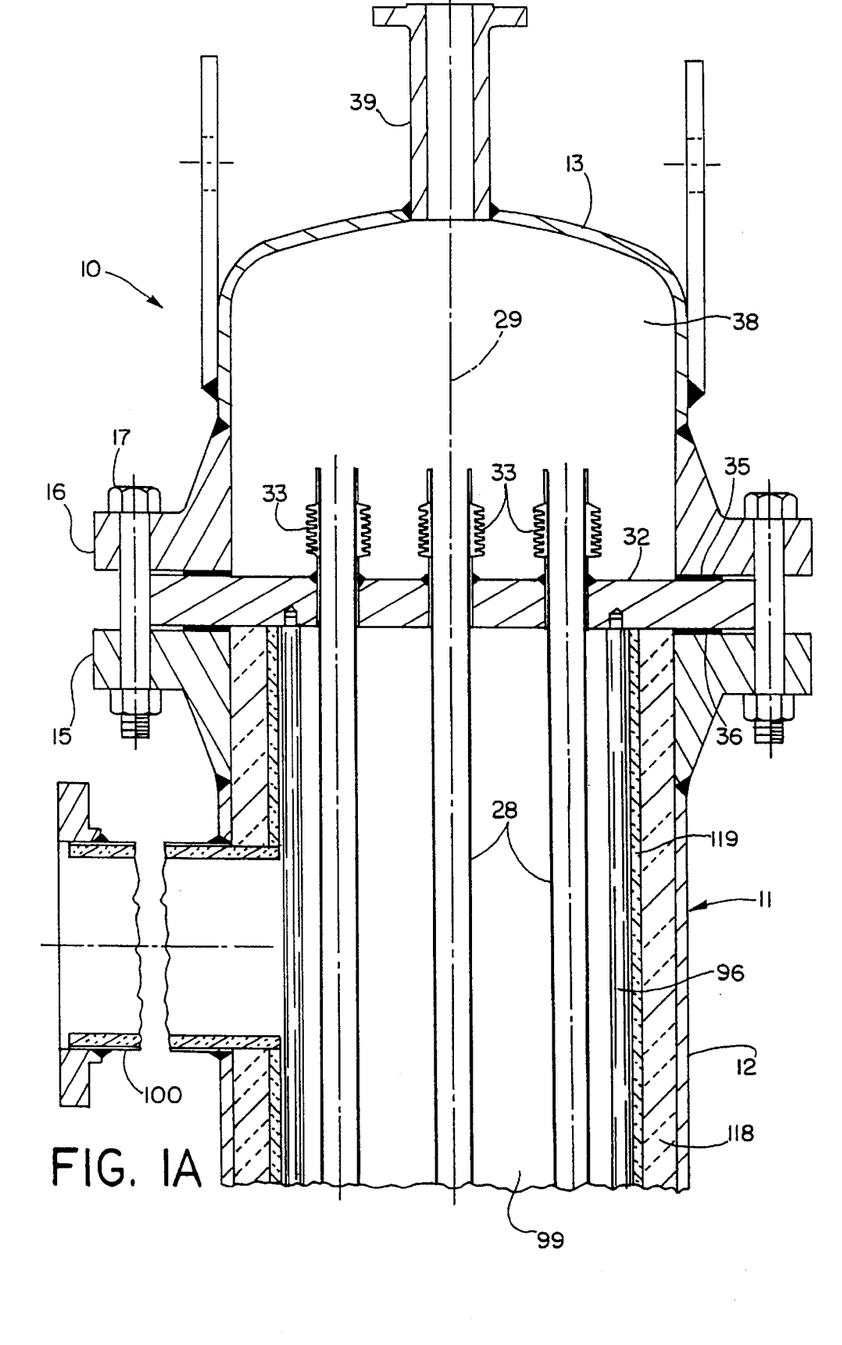
FIGS. 1A–1D are broken continuations of a fragmented longitudinal cross-sectional view of an endothermic reaction apparatus according to the invention, taken along the line 1—1 of FIG. 2.
Figure 1B:
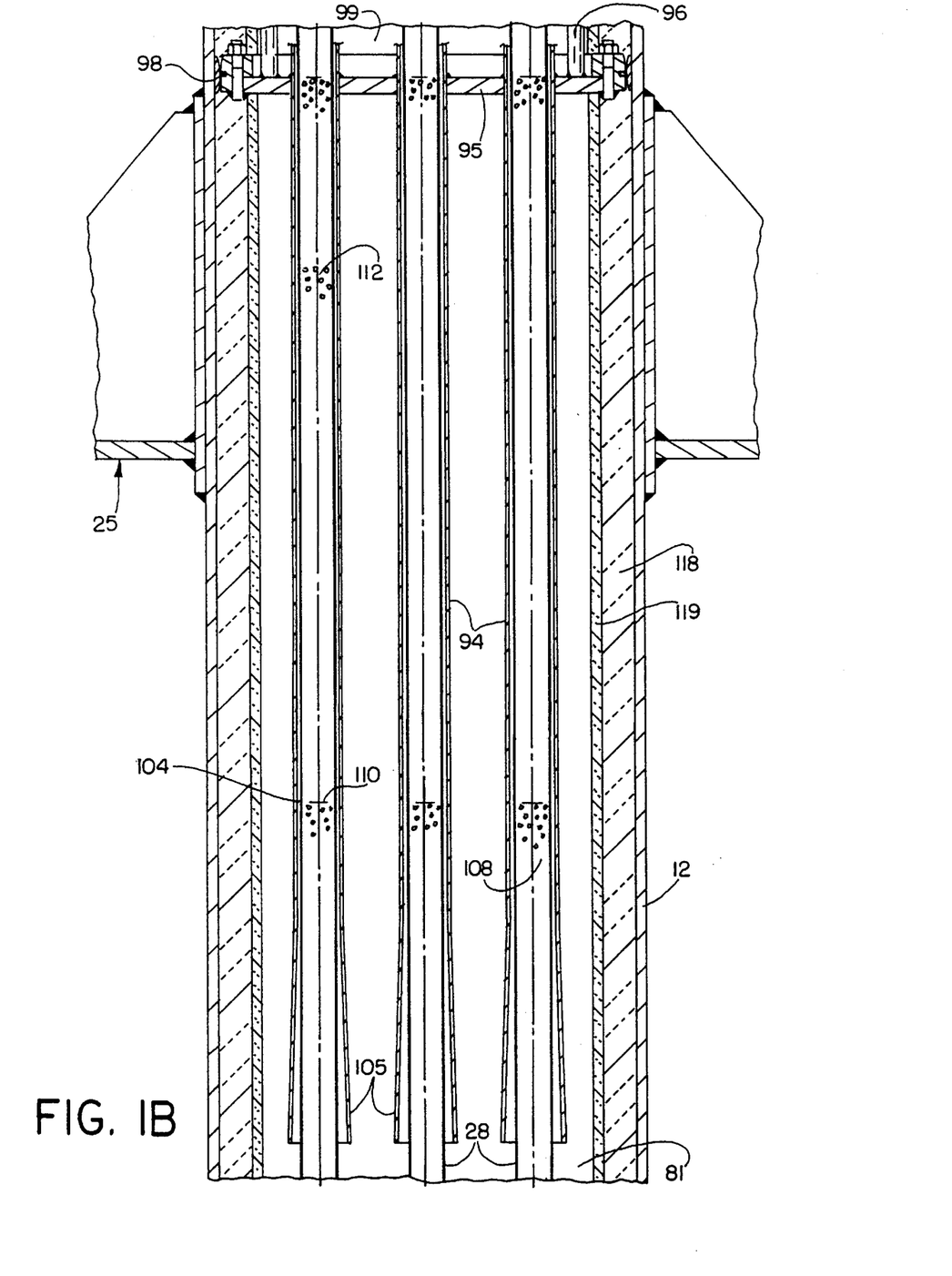

As shown in FIG. 1A, the upper (upstream) ends of the reaction tubes 28 are attached to a fixed tube sheet 32 by respective expansion joints or devices 33 that preferably are in the form of corrugated metal collars or bellows, as shown. In the illustrated embodiment, the reaction tubes 28 pass through respective openings in the tube sheet 32 and project above the tube sheet. The expansion bellows 33 are telescoped over the projecting end portions of the tubes and have their upper ends secured as by welding to the tube and their lower ends secured as by welding to the tube sheet 32. In this manner, the bellows and annular welds seal the gaps between the reaction tubes and the tube sheet while permitting axial movement of individual reaction tubes relative to the tube sheet.

The tube sheet 32 extends transversely of the longitudinal axis 29 of the vessel 11 and has its peripheral edge portion sandwiched between the upper end closure 13 and the shell 12. In this manner the upper tube sheet 32 is fixedly secured to the vessel. As shown, gaskets 35 and 36 are provided to seal against leakage between the tube sheet 32 and the upper end closure 13 and the shell 12.

The tube sheet 32 cooperates with the upper end closure 13 to form an inlet plenum or manifold 38 for receiving endothermic reactant fed into the vessel 11 through inlet port 39 provided at the upper end of the vessel. The inlet manifold 38 is connected to, i.e., in fluid communication with, the upper ends of the reaction tubes 28 for flow of the endothermic reactant downwardly through the reaction tubes.

At the lower end of the vessel 11 shown in FIG. 1D, the reaction tubes 28 are connected at their lower (downstream) ends to a second tube sheet 40 that extends transversely with respect to the longitudinal axis 29 of the vessel. The lower ends of the tubes may be secured and sealed to the tube sheet 40 by any suitable means and preferably by welding with the weld extending annularly around the respective reaction tube to provide a seal. The tube sheet 40 forms a part of a head 41, herein termed a floating head because it is not rigidly attached to the shell 12 but instead can move independently of the shell 12 along the longitudinal axis of the shell. The floating head 41 additionally includes a domed cover 42. The domed cover 42 has an annular flange 43 to which a split clamp ring 44 is connected by fasteners 45. The clamp ring 44 secures the tube sheet 40 to an end face of the domed cover and a gasket 46 is provided to seal the joint between the tube sheet 40 and the domed cover 42.

The tube sheet 40 and domed cover 42 cooperate to form interiorly thereof an outlet plenum or manifold 49. The outlet manifold is connected to, i.e., in fluid communication with, the lower ends of the reaction tubes 28 for receiving the endothermic product exiting the reaction tubes. The outlet manifold 49 is also connected by a longitudinally extending conduit 50 to an outlet port 51 at the bottom of the vessel 11. The conduit 50 includes a tubular expansion device preferably in the form of a tubular metal bellows 52 that is arranged for axial deflection thereby to accommodate differential movement between the floating head 41 and the lower end closure 14 and consequently the shell 12. As shown in FIG. 1D, the expansion bellows 52 has one end connected to the floating head 41 and its other end connected to the port 51.

The floating head 41 and conduit 50 separate the flow path for the endothermic product fluid from a surrounding space 55 within the lower end closure 14. In the illustrated preferred embodiment, this interior space 55 will normally contain only air and, in particular, pressurized air being fed into the reaction vessel to support combustion in the hereinafter described manner. As will be further described below, air is fed into the vessel via an air inlet port 56 which is connected to an air inlet manifold or plenum 58. Air from the inlet plenum 58 may be allowed to fill the interior space 55 which is otherwise closed to the outside except at a port 59. The port 59 provides a convenient means for monitoring for the presence of the endothermic reaction product in the interior space 55, which would be indicative of a leak. For example, a probe may be installed at the port 59 to sense for endothermic reaction product.

As shown at the bottom in FIG. 1D, the lower end of the conduit 50 is secured by a split retaining ring 60 against longitudinal movement relative to the outlet port 51 and the joint between the conduit and port member 51 is sealed by a suitable gasket or sealing member 61.

Figure 1C:
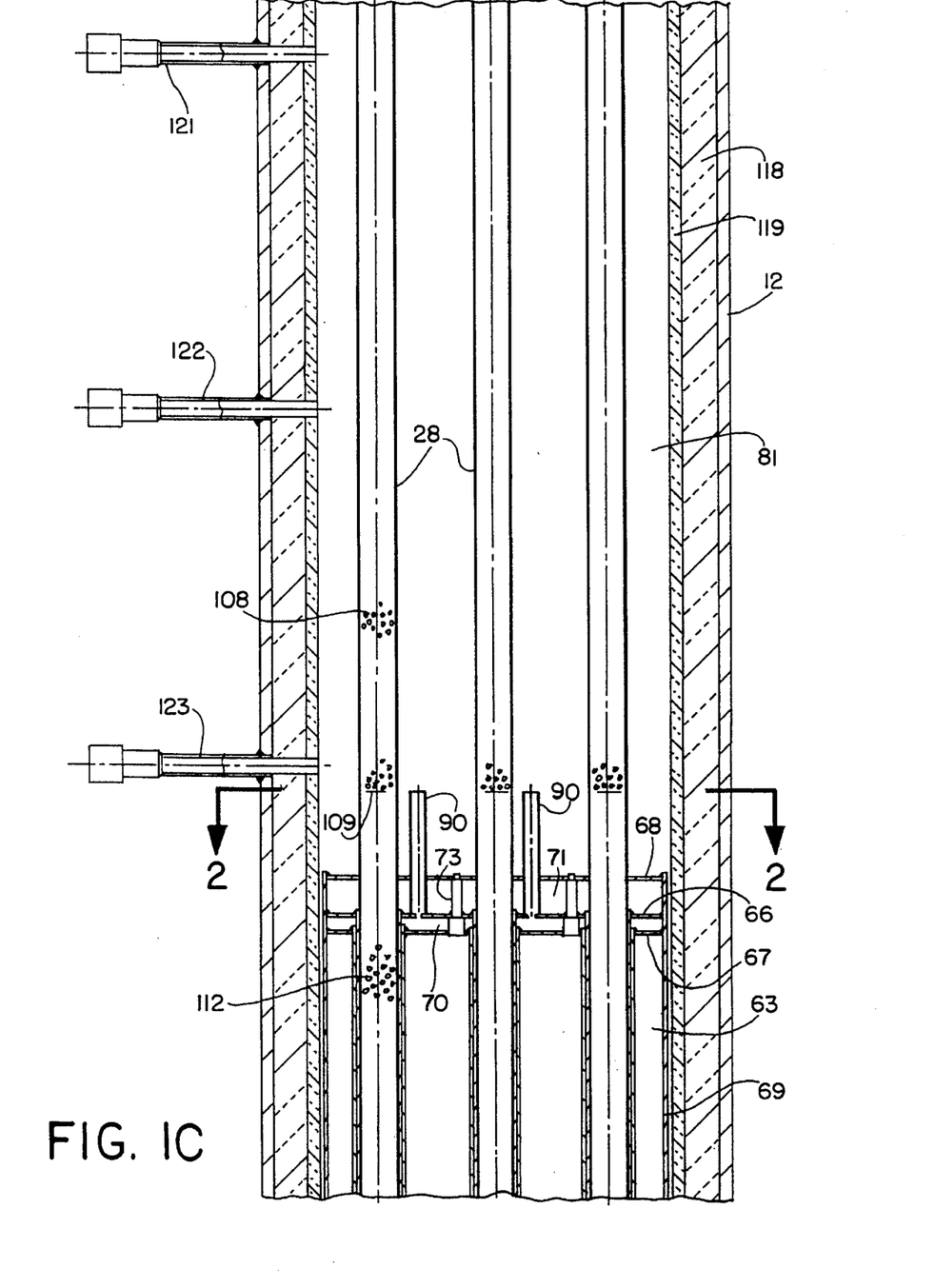
Figure 1D:
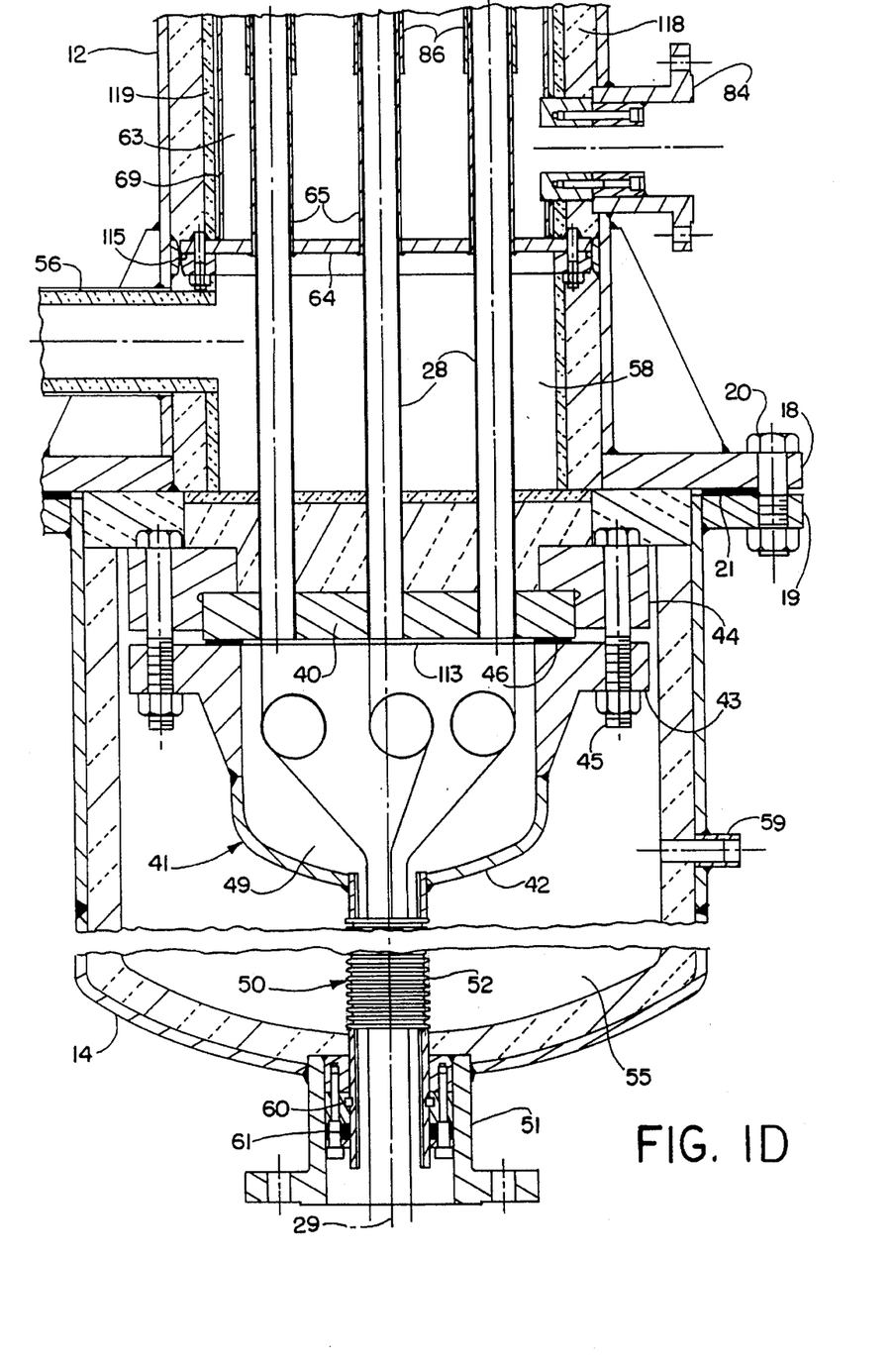

Referring to FIGS. 1C and D, the air inlet manifold 58 is separated from a fuel inlet manifold 63 by an air supply tube sheet 64. The air supply tube sheet 64 has connected and sealed thereto as by welding or other suitable means the lower ends of a plurality of air supply tubes 65 through which portions of respective reaction tubes 28 extend in parallel and preferably in concentric relationship. The other ends of the air supply tubes are connected and sealed as by welding or other suitable means to an upper air supply tube sheet 66. The air supply tube sheet 66 is located between a fuel supply tube sheet 67 and an air distribution plate 68. The sheets 66 and 67 and plate 68 extend transversely with respect to the longitudinal axis 29 of the vessel 11 and are secured and sealed as by welding at their outer peripheral edges to a tubular drum or casing 69 at the upper end of the latter, to which the tube sheet 64 also is secured and sealed as by welding to the lower end of the drum. The tube sheets 66 and 67 are spaced apart along the longitudinal axis 29 to form therebetween a preheated fuel distribution plenum 70. The tube plate 66 and air distribution plate 68 also are spaced apart along the longitudinal axis 29 and define therebetween a preheated air distribution plenum 71. One or more spacers 73 may be provided to maintain the spacing between the tube sheets 66 and 67 and air distribution plate 68.

Figures 2, 3, 4:
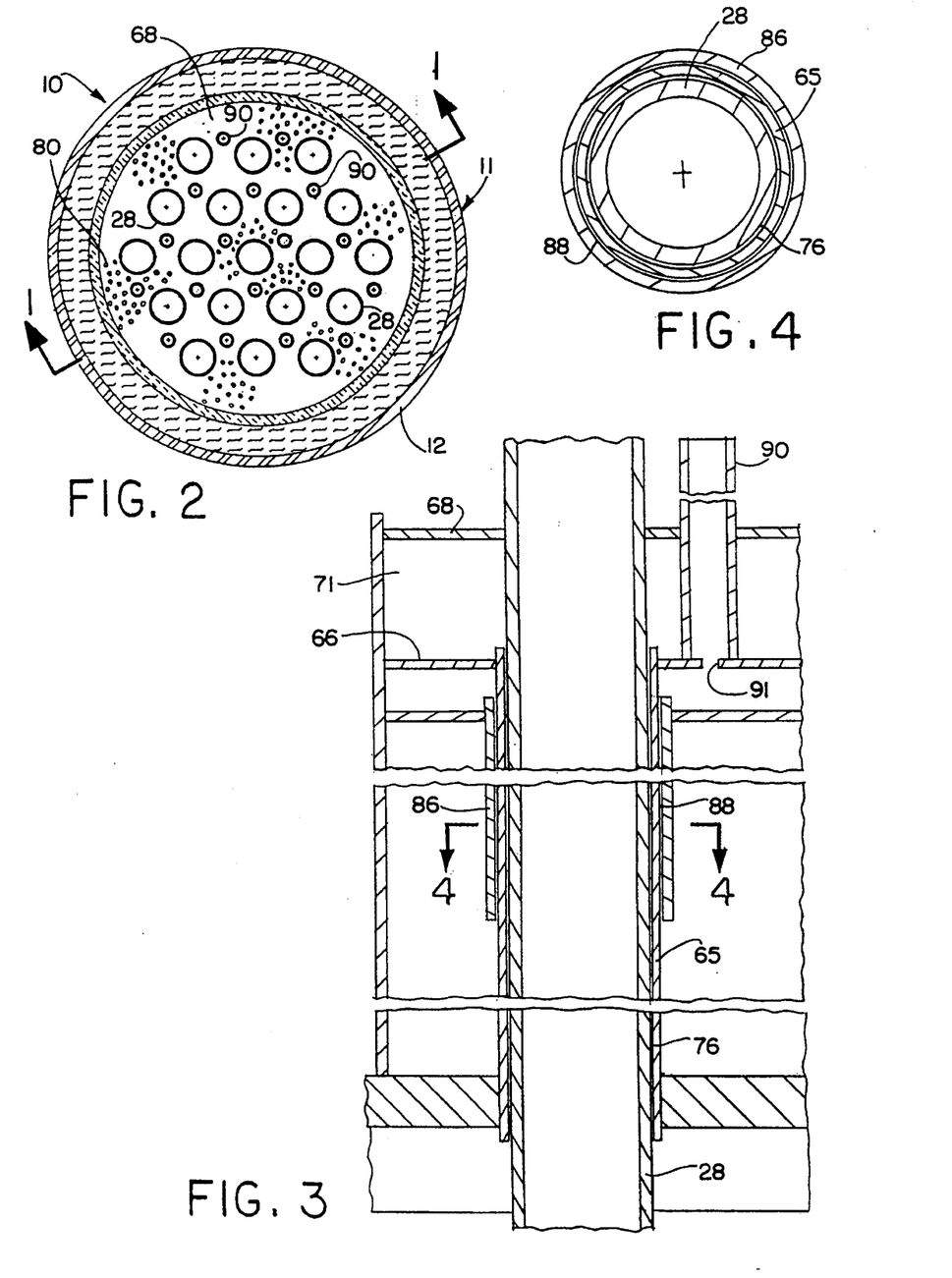
FIG. 2 is a transverse cross-sectional view of the apparatus taken along the line 2—2 of FIG. 1C.
FIG. 3 is an enlarged fragmented portion of FIGS. 1C and 1D.
FIG. 4 is a transverse cross-sectional view taken along the line 4—4 of FIG. 3.

As shown in FIGS. 3 and 4, each air supply tube 65 has an inner diameter slightly greater than the outer diameter of the reaction tube 28 passing therethrough, thereby forming therebetween an air supply passage 76. Preferably, the reaction tube 28 and the air supply tube 65 are generally concentric and the air supply passage 76 is in the form of an annulus of uniform radial thickness surrounding the reaction tube 28. At the air supply tube sheet 66, the air passage 76 within each air supply tube 65 is connected, i.e., in fluid communication with, the air distribution plenum 71. The air distribution plenum is preferably of sufficient size to provide for relatively uniform pressure across the back side of the air distribution plate 68.

The air distribution plate 68 has therein a plurality of air outlet openings or holes 80 which are uniformly distributed over the area of the distribution plate 68, as depicted in FIG. 2. Although only some of the openings 80 are shown in FIG. 2, it should be understood that the openings 80 are preferably uniformly distributed over the area of the distribution plate 68 and preferably account for about 2–15% of the total area of the plate 68, more preferably about 4–10% and still more preferably about 6%. The openings 80 may be arranged in a variety of patterns including a random array, in rows which may be aligned or staggered, etc. As discussed further below, the openings 80 provide for introduction of air into an exothermic reaction chamber 81 (FIG. 1C) substantially uniformly transversely across the exothermic reaction chamber to form a moving wall of air preferably having a substantially planar front extending transversely to the longitudinal axis 21 of the vessel. However, the size and arrangement of the openings 80 may be varied as may be desired to vary the shape of the front of the moving air mass as it moves into a flame zone for mixing with fuel supplied in the following manner to the exothermic reaction chamber 81 which extends above the plate 68 interiorly of the shell 12.

With reference to FIGS. 1C and D, pressurized fuel is fed into the vessel 11 via a fuel inlet port 84. The fuel inlet 84 is connected to the fuel inlet manifold 63 formed interiorly of the tubular casing 69 and defined at its upper and lower ends by the fuel supply tube sheet 67 and the air supply tube sheet 64, respectively. The fuel inlet manifold 63 is connected to, i.e. in fluid communication with, the inlet ends of a plurality of fuel supply tubes 86. The fuel supply tubes 86 are connected and sealed at their upper ends, as by annular welds, to the fuel supply tube sheet 67.

As best shown in FIGS. 3 and 4, the fuel supply tube 86 is telescoped over the air supply tube 65 along a portion of the length of the latter. The inner diameter of the fuel supply tube 86 is greater than the outer diameter of the air supply tube 65 thereby to form a fuel passage 88. Preferably, the fuel supply tube 86 is concentric with the air supply tube 65 and reaction tube 28 which extend therethrough in order to form an annular passage of uniform radial thickness which extends along the length of the fuel supply tube.

At its upper end, the fuel passages 88 and the fuel supply tubes 86 are connected to, i.e., in fluid communication with, the fuel distribution plenum 70. The fuel distribution plenum 70 in turn communicates with the inlet ends of a plurality of nozzle tubes 90 that are connected to and extend upwardly from the air supply tube sheet 66. The fuel nozzle tubes 90 extend upwardly through and project beyond the air distribution plate 68 which is provided with openings for passage of the nozzle tubes therethrough. The nozzle tubes preferably terminate at a common plane transverse to the longitudinal axis 29 of the vessel 11, which plane may be at about the air distribution plate but more preferably is spaced downstream from the distribution plate along the longitudinal axis 29. However, if desired, the lengths or terminal points of the nozzle tubes 90 may be varied as may be desired to obtain different flame profiles. Preferably, each fuel nozzle tube 90 has associated therewith a flow restricting orifice 91 (FIG. 3) which functions to make the fuel flow velocities more uniform from nozzle tube to nozzle tube.

As seen in FIG. 2, the nozzle tubes 90 preferably are uniformly laterally spaced apart from relatively adjacent reaction tubes 28. The reaction tubes in the illustrated embodiment are laterally spaced apart at a constant pitch, and the nozzle tubes are similarly arranged at the same pitch but with each nozzle tube laterally offset from the immediately adjacent reaction tubes by an equal amount. As will be appreciated by those skilled in the art, other reaction tube and nozzle tube arrangements may be utilized, as may be desired for a particular application. Preferably, the ratio of nozzle tubes to reaction tubes preferably should be between 4:1 and 1:2, more preferably between 1.5:1 and 1:1.5, and still more preferably about 1:1 (equal).

As is discussed further below, the air and fuel are preferably preheated to a sufficiently high temperature such that when the fuel exiting from the nozzle tubes 90 contacts the air in the exothermic reaction chamber 81, the fuel will auto-ignite. That is, the air and fuel are heated such that when combined the mixture thereof will have a temperature higher than the ignition temperature of the fuel. The resultant flame and the products of combustion will flow upwardly through the exothermic reaction chamber within the vessel and exit via exhaust tubes 94 that are connected at their upper ends to an exhaust tube sheet 95 as shown in FIG. 1B.

The exhaust tube sheet 95 defines the upper end of the exothermic reaction chamber 81 in the illustrated embodiment. As illustrated in FIGS. 1A and B, the exhaust tube sheet may be dependently supported from the reaction tube sheet 32 by spacer rods 96. The exhaust tube sheet preferably is provided with a floating seal 98 which seals the exhaust tube sheet to the interior surface of the shell 12 to separate the exothermic reaction chamber 81 from an exhaust outlet manifold 99. The exhaust outlet manifold is formed between the exhaust tube sheet and the reaction tube sheet 32, and is connected to an exhaust outlet port 100.

Each exhaust tube 94 closely surrounds a portion of the respective reaction tube 28 to form a narrow annular exhaust passage 104 for the exhaust gases flowing from the exothermic reaction chamber to the exhaust outlet manifold 99. Preferably, the exhaust tube and reaction tubes are concentric to form an annular passage at tube sheet 40. The narrow exhaust passage 104 results in high velocity flow of the exhaust gas passing therethrough to increase convection heat transfer between the outgoing exhaust and the incoming endothermic reactant.

In accordance with the invention, the inlet end of each exhaust tube is radially outwardly flared as indicated at 105 in FIG. 1B to provide for a progressive increase in the flow velocity of the combustion gases as they enter into the exhaust tube. This avoids excessive heat concentration at the inlet end of the exhaust tube thereby to prevent excessive localized heating of the reaction tube and/or exhaust tube.

Although the endothermic reaction apparatus 10 as thus far described may be used to carry out endothermic reactions substantially in the manner hereinafter described, some endothermic reactions may require or are facilitated by the use of a catalyst. In the illustrated embodiment, the reaction tubes 28 contain an endothermic reaction catalyst, the selection of which will depend upon the particular endothermic reaction being conducted within the apparatus 10.

In the illustrated embodiment, the reaction tubes 28 are filled with an endothermic reaction catalyst 108 coextensively with an exothermic reaction zone 81 extending generally from a point 109 at about the outlet ends of the nozzle tubes 90 to a point 110 intermediate the lengths of the exhaust tubes 94. The catalyst may be composed of spheres of desired size, for example, about 3 millimeters in diameter. The reaction tubes also preferably are provided with inert material 112 at both ends of the endothermic reaction catalyst 108. Preferably the inert material is of a larger particle size, for example about 6 mm diameter spheres, to minimize pressure losses. In the illustrated embodiment, the reaction tubes 28 are filled with inert material 112 from their lower ends to approximately the ends of the nozzle tubes where the endothermic reaction catalyst starts 109. Also, inert material is filled in the reaction tubes above the exothermic reaction catalyst beginning at 110 and continuing upwardly to about the top of the exhaust tubes 94. The catalyst and inert material are prevented from falling out through the lower ends of the tubes by a containment screen 113 (FIG. 1D) secured to the bottom side of the tube sheet 40.

Reverting to FIGS. 1C and 1D, the casing 69, air distribution plate 68 and tube sheets 64, 66 and 67 may be fabricated as a unit as shown. The bottom of this fabricated unit is preferably provided with a floating seal 115 at the tube sheet 64 which seals the unit to the interior surface of the shell 12 to preclude backflow of combustion products below the seal 115 and into the air supply manifold 58.

To prevent external heat losses, the interior of the shell 12 is lined with insulation. In particular, an alumina mat insulation 118 is provided adjacent the interior surface of the shell which may be made of alloy steel. Interiorly of the mat insulation 118 there is provided a fiber alumina insulating tube 119, and this tube may be painted on its inside surface with an anti-erosion paint. The top side of the tube sheet 40 may be similarly provided with insulation, and the interior of the lower end closure 14 may be lined with the mat insulation as shown in FIG. 1D. Also, the vessel may be provided with view ports 121–123.

The operation of the endothermic reaction apparatus 10 will now be described in relation to the reforming of a reformable feed stock. However, it will be appreciated that the apparatus may be used to carry out a variety of endothermic reactions.

In accordance with the method of the invention, pressurized air and fuel are fed into the vessel through the air and fuel inlet ports 56 and 84. Although reference herein is made to the use of fuel and air as exothermic reactants, it will be appreciated that other exothermic reactants may be used. By way of example, oxygen or other oxygen bearing fluids may be used to support combustion of an oxidizable fuel. However, other exothermic reaction fluids may be used for generating flame and heat when reacted in the hereinafter described manner.

Air being fed to the air inlet port 56 passes into the air inlet manifold 58. From the air inlet manifold, the air will flow through the air supply annuluses 76 surrounding a portion of the reaction tubes 28 at a velocity substantially greater than the inlet feed velocity by reason of the smaller cross-sectional area of the annuluses. At the downstream end of the air supply passages the preheated air flows into the air distribution manifold 71 and then through the openings 80 into the exothermic reaction chamber 81 in a direction parallel to the adjacent reaction tubes for flow around and along the reaction tubes.

Fuel, such as hydrogen-rich plant tail gas containing about 80% hydrogen, is fed through the fuel inlet port 84 into the fuel inlet manifold 63. From the fuel inlet manifold, the fuel will flow through the fuel supply annuluses 88 surrounding a portion of the air supply tubes 65 at a velocity substantially greater than the inlet feed velocity by reason of the smaller cross-sectional area of the annuluses. At the downstream end of the fuel supply passages the fuel flows into the fuel distribution manifold 70 and then through the flow restricting orifices 91 into the nozzle tubes 90. The nozzle tubes direct respective high velocity jets of preheated fuel into the exothermic reaction chamber 81 in a direction parallel to the adjacent reaction tubes. The velocity of the fuel through the nozzle tubes preferably is greater than about 30 m/sec and more preferably greater than about 60 m/sec. As the jets of fuel exit the nozzle tubes, the fuel will mix and react with the preheated air (i.e., will burn) over a longitudinally extended flame region. The illustrated arrangement provides for long narrow flames which provide for high temperature heating of the reaction tubes over a long flame length region preferably greater than about 25 cm, more preferably greater than about 50 cm and still more preferably greater than about 1 meter, or longer.

A long flame is advantageous because it spreads out the heat release over a longer region of the adjacent reaction tube or tubes thereby avoiding excessive local hot spots on the walls of the reaction tubes. In other words, the long flames minimize how hot the hottest spot of the tube wall is. Basically, the long flame provides a balance between the objective of heating the catalyst inside the reaction tubes as high as possible while limiting the tube wall temperature to a value that does not cause premature failure of the reaction tubes.

Another desirable characteristic of the flame generated by the nozzle tubes in the illustrated apparatus is that the flame is relatively thin in view of the close spacing between the reaction tubes. A thin flame minimizes the extent to which the reaction tubes are heated by radiation from the flame. Accordingly, the preferred tube separation distance is quite small when compared to conventional radiant reformers. In the illustrated embodiment, the pitch of the reaction tubes preferably is about 1.25 times the outer diameter of the fuel supply tubes 86. More generally, the center to center spacing of the tubes is preferably no greater than 4 times the diameter of the reaction tubes and more preferably no greater than 2 times the diameter of the reaction tubes. Not only does the small lateral separation between the reaction tubes reduce the radiation heating component, but it also provides for a more compact reaction tube bundle and hence a smaller vessel size in transverse dimension. In addition to the foregoing, the reaction tubes preferably have an inner diameter in the range of 10 to 60 millimeters and more preferably between 15 to 45 millimeters, as is further discussed below.

The combustion products or, more generally, the exothermic reaction products, flow upwardly around and along the intermediate portions of the reaction tubes that extend through the exothermic reaction chamber 81. The combustion products will continue to heat the endothermic reaction catalyst in the reaction tubes and the endothermic reactant flowing through the reaction tubes. The combustion products exit from the exothermic reaction chamber through the exhaust tubes 94 which closely surround the reaction tubes to form narrow annular exhaust passages to provide for high flow velocities in the region of the exhaust tubes. This greatly enhances the heat transfer coefficient between the exhaust and endothermic reactant counter-flowing through the reaction tubes at the downstream end of the exothermic reaction chamber.

In accordance with the present invention, the exhaust tubes are radially outwardly flared at their inlet ends. This provides for a gradual increase in the flow velocity to prevent the reaction tube wall from getting too hot as might otherwise occur if the exhaust gas velocity was sped up immediately to a very high value. The gradual increase in flow velocity of the exiting exhaust gases allows heat transfer within the region of the flare to cool off the hot exhaust before it reaches the minimum area of the exhaust flow passage between the exhaust tube and reaction tube. In the illustrated embodiment, at its inlet end the radial gap between the exhaust tube and reaction tube is at least about 2 times greater than its minimum gap, more preferably at least about 4 times greater and still more preferably about 5 times greater.

From the exhaust tubes, the combustion products flow into the exhaust manifold 99 for flow out through the exhaust outlet port 100. By the time the combustion products reach the exhaust outlet port 100, they will have been substantially cooled thereby avoiding the need for a very high temperature fluid seal between the exhaust port 100 and the wall of the vessel 11.

An endothermic reactant, which may be, for example, a gaseous mixture of steam and a reformable feed stock, is fed into the inlet manifold 38 via the inlet port 39. The inlet manifold uniformly distributes the endothermic reactant among the reaction tubes 28 for downward flow therethrough. The endothermic reactant is preheated by convective heat transfer from the combustion products flowing countercurrently through the exhaust tubes 94. This preheat is provided to ensure that the temperature of the endothermic reactant is above a minimum temperature prior to contacting the reaction catalyst intermediately along the length of the exhaust tubes. In the case of steam reforming of hydrocarbons, the temperature of the gaseous reactant should be greater than about 700° C. (depending upon the particular feed composition and type of catalyst used) prior to contacting the catalyst thereby to avoid potential carbon formation. Accordingly, a reactant being fed into the vessel at about 400° C. or above may be preheated as described to about 700° C. or higher prior to contacting the reaction catalyst.

As the endothermic reactant moves through the reaction catalyst 108, it will absorb heat and react to produce an endothermic product. The endothermic reactant will absorb heat from the flame and combustion products flowing countercurrently through the exothermic reaction chamber 81. The catalytic reaction continues until the hot endothermic product passes beyond the point 109 where it starts to pass through the inert material 112 in the downstream end portions of the reaction tubes. In the region of the air and fuel supply tubes 65 and 86, heat will be transferred from the hot endothermic product to the air and fuel being supplied through the air and fuel supply tubes, thereby to preheat the air and fuel while also cooling the hot endothermic product. Through this heat exchange, the endothermic product will be cooled to a sufficiently low temperature to avoid the need for very high temperature seals at the outlet port 51 at the bottom of the vessel 11. Also, the air and fuel will be sufficiently preheated such that when mixed in the exothermic reaction chamber, the temperature of the mixture will be above and preferably well above the ignition temperature of the fuel, thereby to effect auto-ignition of the fuel and continued combustion independently of any ignition devices and/or large conventional burner structures, as is preferred.

For cold starts, an external burner (not shown) is employed to preheat the incoming air to a temperature above the auto-ignition temperature of the particular exothermic reactants involved and for typical fuels above 550° C. After the apparatus has been sufficiently preheated, fuel is admitted to initiate auto-ignition, and endothermic reactant is fed into the apparatus to establish internal preheating of the air and fuel. After auto-ignition has become self sustaining, the external burner may be shut off. This is a preferred means by which to cold start the reaction apparatus, although it will be appreciated that other devices may be employed.

Although evident from the foregoing description, the flow rates of the endothermic reactant and product and the size and shape of the various tubes, passages and orifices are so selected that when the air and fuel are mixed in the exothermic reaction zone they will be at or above their auto-ignition temperature. By this means, they will mix, ignite and combust without the need for a separate igniter such as a glow plug, spark plug or the like. The flow rates also are determined to obtain a desired endothermic reactant temperature profile and exothermic reactant temperature profile. More particularly, the mass flow rate of the endothermic reactant and product and the mass flow rate and velocity of the fuel and air may be optimized to maintain the reaction tube wall temperature below a temperature that would lead to premature failure of the reaction tubes. This temperature will depend on various factors including the tube material, the pressure difference between the inside and outside of the reaction tube, and the reaction tube's diameter and thickness. In the illustrated embodiment, the maximum outside tube wall temperature may be maintained at about 912° C. while attaining a maximum reactant temperature of 900° C., thereby providing a temperature differential of only about 12° C. Accordingly, the endothermic reactant may be heated to a high temperature while still maintaining an outside wall temperature below a temperature that would cause premature failure of the reaction tubes. At the same time, the fluids exiting the apparatus are cooled to reasonable temperatures while inside the vessel the exothermic reactants are heated to above their auto-ignition temperatures. In the illustrated embodiment, the close approach between the peak catalyst temperature and the peak tube wall temperature results from two factors: 1) the much higher heat transfer coefficient from tube wall to process gas inside the reaction tubes (on the order of 3500 W/m$^{2\circ}$ C.) versus the much lower heat transfer coefficient from the flame to the tube wall (on the order of 80 W//m$^{2\circ}$ C.) and 2) the location of the peak flame temperature at a different place along the tube from where the peak process temperature occurs (on the order of 50 cm apart). Preferably, the heat transfer coefficient inside the reaction tube exceeds the heat transfer coefficient outside by a factor of 20 and more preferably by a factor of 40, or more.

The illustrated endothermic reaction apparatus is particularly suited for large-scale operation such as the commercial production of synthesis gas by the steam reforming of gaseous hydrocarbons, especially methane and natural gas. Steam reforming reactions are favored by higher temperatures, such as for example 800° to 1000° C. and more preferably 870° to 920° C., while most downstream uses of syngas, for example, methanol synthesis and Fischer-Tropsch synthesis, are favored at high pressures, such as for example at least 10 atm, preferably 20 to 60 atm, more preferably 30 to 50 atm. Therefore, it is desirable to operate at relatively high pressure within the reaction tubes. On the other hand, it is desirable to operate the exothermic reaction at considerably lower pressures thereby avoiding the need for expensive compressors or the like that would otherwise be necessary to boost the pressure of the fuel and air to a high pressure. For example, air may be fed into the system at about 15 psi, although other pressures may be used such as pressures within the range of 10 to 30 psi. The pressure of the fuel feed may be comparable and may, for example, be about 20 psi which is a customary fuel feed pressure, although other fuel feed pressures may be used such as fuel pressures in the range of 10 to 30 psi.

Generally, an endothermic reaction apparatus according to the invention is particularly suitable for use with endothermic reactant feed pressures greater than about 100 psi, more preferably greater than about 200 psi and still more preferably at pressures greater than about 300 psi. On the other hand, the feed pressures of the exothermic reactants preferably are lower than about 100 psi, more preferably lower than 50 psi and still more preferably lower than 30 psi. Also, the apparatus is intended for use in achieving reactant temperatures preferably greater than about 700° C., more preferably greater than about 800° C. and more preferably about 900° C.

Determining the best design and operating conditions of the apparatus for a particular application depends on a number of factors as discussed herein. For example, steam-methane reforming (and many other endothermic reactions of interest) is favored by high temperatures and low pressures. However, most applications for the endothermic product, syngas, (and many other products) require that the syngas be at high pressure. The use of a compressor to compress syngas is very expensive; therefore, it is practical to utilize high infeed pressures for the endothermic reactant being fed into the apparatus so as to obtain a useful syngas pressure at the outlet port of the apparatus.

As is preferred, the inside diameter of the reaction tubes is relatively small, for example, 10 to 60 millimeters, preferably 15 to 45 millimeters, for economic reasons, although reaction tubes of other diameters could also be used. A small diameter requires a thinner wall than a larger diameter for the same temperature and differential pressure and hence is less costly. However, tubes that are too small will require more tubes to obtain the same throughput and a corresponding increase in cost. Also, very small diameters may cause catalyst packing problems, leading to locally poor heat transfer. Larger tubes will exhibit unfavorable radial temperature gradients.

The length ratio of the reaction tubes to their inside diameter preferably is in the range of 100:1 to 350:1, although this may vary depending on the application.

Preferred metal alloys for use in the high temperature regions of the apparatus have high temperature strength (resistance to creep and creep rupture) and high resistance to both oxidation and to process gas corrosion. Among the alloys suitable for typical applications are various nickel-base-temperature alloys. For example, for use in steam reforming of methane, the various tubes may be made of a nickel-based alloy containing chromium, tungsten and molybdenum, such as Haynes® 230 (22% Cr, 14% W, 2% Mo, balance Ni) available from Haynes International, Inc. of Kokomo, Ind. If desired, the reaction and/or other tubes may be provided with suitable coatings to prevent metal dusting and other forms of attack. Such coatings are well known in the art, Alonizing being a specific example.

The preferred peak process temperature depends upon the pressure chosen, the tube material, the feed mixture composition and the requirements of external processes. It is often desirable to operate at the highest temperature which will give acceptable tube life under chosen conditions, preferably longer than one year and more preferably many years. In these cases, metallic tubes may preferably operated in the range of about 850° C. to 1000° C. In other cases, a superior process heat balance and overall cost savings may be obtained at somewhat lower temperatures than the above, with the preferred peak process temperature for metallic tubes being about 875° to 925° C.

As is preferred, the apparatus is designed and operated so that during steady state operation the difference between the temperature to which the fuel and air are heated prior to mixing in the combustion zone and the maximum endothermic reaction temperature is less than about 250° C. Preferably this difference is 100° to 200° C. Since most of the common gaseous fuels auto-ignite with air at temperatures of about 400° to 600° C., and since most endothermic reactions of interest occur at approximately 850° to 950° C., this means that at normal operation the air and gaseous fuel should be heated significantly above its auto-ignition temperature before being combined in the exothermic reaction chamber, such as to a temperature between 600° and 850° C.

It is also desirable to design and operate the apparatus so that the combustion product gases are cooled significantly before exiting the furnace, such as below 700° C., thereby avoiding the need for very high temperature seals at the outlet ports for the combustion product gases. Similarly, it is desirable to cool the endothermic product significantly before exiting the furnace, again below 600° C. and preferably on the order of about 550° C. or lower.

An endothermic reaction apparatus embodying one or more of the inventive features hereof can be used to carry out a wide variety of endothermic reactions such as steam reforming of light hydrocarbons, especially methane, ethane and natural gas, the pyrolysis of alkanes such as ethane and propane to their corresponding alkenes, ethylene and propylene, and so forth. Such processes are well known in the art.

As above indicated, some of these processes can be carried out without a catalyst while others require or usually employ a suitable catalyst. Where a catalyst is used, it should maintain sufficient activity over a long period of time at the high temperatures encountered. The catalyst should be strong enough to support its own weight. It should also have a particle size which is small enough to properly fill the interiors of the reaction tubes and to provide for high heat transfer coefficients, but large enough to minimize pressure drop through the reaction tubes to acceptable levels. In the preferred embodiment, the pressure drop through the bed is actually quite large relative to conventional practice in order to maximize inside heat transfer, e.g., about 7–10 atm. Also, preferably the catalyst should not sinter-bond excessively to itself or to the reaction tubes even after long exposures at high temperatures. A suitable form of nickel on alumina is one possible steam reforming catalyst, but other catalysts are also reported to be suitable for various endothermic reactions including the reforming of light hydrocarbons.

For hydrogen production, either a high-temperature shift catalyst and/or a low-temperature shift catalyst can optionally be placed within the reaction tubes in the zone where an endothermic product containing carbon monoxide is cooling as this will cause some of the carbon monoxide to react with excess water to form additional hydrogen and carbon dioxide as a by-product (the so-called "water-gas shift" reaction).

Figure 5:
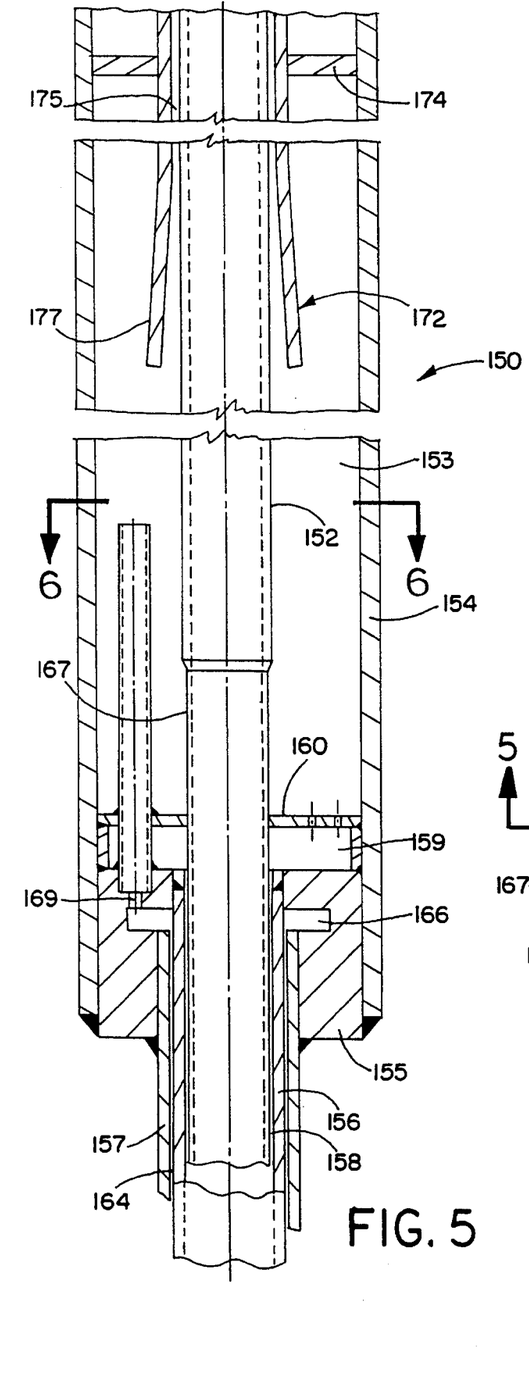
FIG. 5 is a fragmented cross-sectional view of another embodiment of endothermic reaction apparatus according to the invention, taken along the line 5—5 of FIG. 6.
Figure 6:
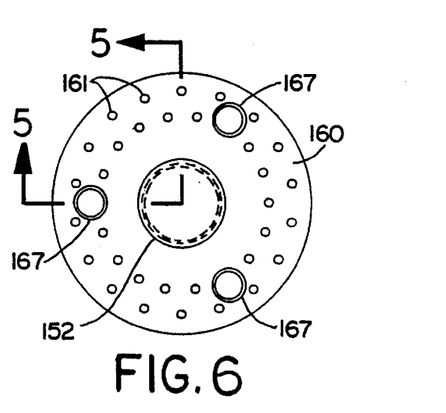
FIG. 6 is a transverse cross-sectional view taken along the line 6—6 of FIG. 5.

Referring now to FIGS. 5 and 6, reference numeral 150 generally indicates another endothermic reaction vessel that includes only a single reaction tube 152. The reaction tube extends through an exothermic reaction chamber 153 surrounded by an outer tube 154 that preferably is cylindrical and concentric with the reaction tube.

At its bottom end, the outer tube 154 is closed by an end plug 155 to which the downstream ends of air and fuel supply tubes 156 and 157 are connected. The end plug 155 functions like a combined tube sheet for supporting and spacing the ends of the air and fuel supply tubes which preferably are concentric with the reaction tube which extends therethrough. The air supply tube 156 has an inner diameter slightly greater than the outer diameter of the reaction tube 152 passing therethrough, thereby forming therebetween an air supply passage 158. The upstream end of the air passage 158 is connected, i.e., in fluid communication with, an air inlet (not shown). The downstream end of the air supply passage is connected to an air distribution plenum 159 formed between the end plug 155 and an air distribution plate 160 within the outer tube 154.

The air distribution plenum 159 is preferably of sufficient size to provide for relatively uniform pressure across the back side of the air distribution plate 160. The air distribution plate 160 has therein a plurality of air outlet openings or holes 161 which are arranged in two circular rows concentric with the reaction tube as shown in FIG. 6.

The fuel supply tube 157 is telescoped over the air supply tube 156 and has an inner diameter greater than the outer diameter of the air supply tube 156 thereby to form a fuel passage 164. The upstream end of the fuel passage 164 is connected, i.e., in fluid communication with, a fuel inlet (not shown). At its downstream end, the fuel supply passage 164 is connected to, i.e., in fluid communication with, a fuel distribution plenum 166 formed in the end plug 155. The fuel distribution plenum 166 in turn communicates with the inlet ends of a plurality of nozzle tubes 167 that are connected to and extend longitudinally from the end plug 155. The fuel nozzle tubes 167 extend through and project beyond the air distribution plate 160 which is provided with openings for passage of the nozzle tubes therethrough. The nozzle tubes preferably terminate at the same transverse plane along the longitudinal axis of the reaction tube. Preferably, each fuel nozzle tube has associated therewith a flow restricting orifice 169 which functions to make the fuel flow velocities more uniform from nozzle tube to nozzle tube.

As seen in FIG. 6, the nozzle tubes 167 preferably are uniformly laterally spaced apart from the reaction tube 152 and are circumferentially equally spaced around the reaction tube. Three nozzle tubes are employed in the illustrated embodiment as is preferred in the case of a single reaction tube to provide flames that encircle the reaction tube.

Like in the apparatus 10, the air and fuel are preferably preheated to a sufficiently high temperature such that when the fuel exiting from the nozzle tubes 167 contacts the air in the exothermic reaction chamber 153, the fuel will auto-ignite. The resultant flame and the products of combustion will flow around and along the reaction tube 152 through the exothermic reaction chamber and exit through an exhaust tube 172 that is connected at its downstream end to an exhaust tube sheet 174. The exhaust tube sheet 174 defines the end of the exothermic reaction chamber 153 opposite the air distribution plate 160.

The exhaust tube 172 closely surrounds a portion of the reaction tube 152 to form a narrow annular exhaust passage 175 for the exhaust gases flowing from the exothermic reaction chamber to an exhaust outlet (not shown). For the above discussed reasons, the inlet end of each exhaust tube is radially outwardly flared as indicated at 177.

In the illustrated embodiment, the reaction tube contains an endothermic reaction catalyst substantially as above described in relation to the apparatus 10. Also, the vessel in this embodiment is formed by the outer tube 154 and the fuel supply tube 157 which may be surrounded by insulation to minimize external heat losses. The air and fuel supply tubes 156 and 157 may be terminated at their upstream ends at respective inlet chambers within a suitably configured vessel end closure. A suitably configured end closure also is provided at the upstream end of the reaction tubes, such end closure including an outlet chamber for the exhaust gases. Also, an expansion joint or bellows may be provided between the reaction tube and the vessel to accommodate relative expansion and contraction.

The endothermic reaction apparatus 150 is operated in a manner similar to the apparatus 10. Air and fuel are supplied through the air and fuel supply passages 158 and 164 wherein the air and fuel is preheated. The preheated fuel flows to the nozzle tubes 167 from which respective jets of fuel are directed into the exothermic reaction chamber 153 in a direction parallel to the adjacent reaction tubes. As the jets of fuel exit the nozzle tubes, the fuel will mix and combine with the preheated air over a longitudinally extended flame region, the preheated air flowing from the air distribution plate. As before, the illustrated arrangement provides for long narrow flames which provides for high temperature heating of the reaction tubes over a long flame length region.

The combustion products flow upwardly around and along the intermediate portions of the reaction tube that extend through the exothermic reaction chamber 153. The combustion products will continue to heat the endothermic reaction catalyst in the reaction tube and the endothermic reactant flowing through the reaction tube. The combustion products exit from the exothermic reaction chamber through the exhaust tube 172.

An endothermic reactant is flowed through the reaction tube 152 counter-currently. The endothermic reactant is preheated by convective heat transfer from the combustion products flowing countercurrently through the exhaust tube 172. As the endothermic reactant moves through the reaction catalyst, it will absorb heat and react to produce an endothermic product. The endothermic reactant will absorb heat from the combustion products flowing countercurrently through the exothermic reaction chamber. The catalytic reaction continues until the hot endothermic product starts to pass through inert material in the downstream end portions of the reaction tubes. In the region of the air and fuel supply tubes 156 and 157, heat will be transferred from the hot endothermic product to the air and fuel being supplied through the air and fuel supply tubes, thereby to preheat the air and fuel while also cooling the hot endothermic product. For other operational details, reference may be had to the above description of the apparatus 10, which details are generally applicable to the apparatus 150.

Many modifications can be made to the above described representative embodiments of the invention. For example, the fuel and air flow paths may be reversed, although this is considered less acceptable than as above described. Gas to liquid condensation might also occur in the coolest zone of the apparatus. These are just a few of the many modifications and alterations that may occur to those skilled in the art. All such modifications are intended to be included within the scope of the present invention, which is to be limited only by the following claims.

What is claimed is:

1. An endothermic reaction apparatus for effecting an endothermic reaction, comprising a vessel, said vessel including an inlet port for an endothermic reactant to be subjected to an endothermic reaction to convert the reactant to an endothermic product, an outlet port for the endothermic product, and an exothermic reaction chamber, a plurality of reaction tubes providing respective flow passages between said inlet and outlet ports, said reaction tubes extending through said exothermic reaction chamber in laterally spaced apart relationship, and first and second supplies for separately supplying first and second exothermic reaction fluids to said exothermic reaction chamber for exothermically reacting within said exothermic reaction chamber and for providing flow of exothermic reaction products in a direction going from an upstream end to a downstream end of said exothermic reaction chamber, said first supply having first fluid outlet means for introducing said first fluid into said exothermic reaction chamber at said upstream end thereof for flow around and along said reaction tubes, and said second supply including second fluid outlet means for introducing said second fluid into said exothermic reaction chamber at or downstream of said first fluid outlet means and at a plurality of discrete locations interposed among but laterally offset from said reaction tubes, whereby said second fluid exiting from said second fluid outlet means combines with said first fluid for generation of high temperature flames around said reaction tubes downstream of said second fluid outlet means and high temperature exothermic reaction products for flow around and along said reaction tubes, for heating said reaction tubes to support an endothermic conversion of the endothermic reactant to the endothermic product as it flows through said reaction tubes, and wherein said first fluid outlet means includes a flow distribution member extending transversely of said reaction tubes at said upstream end of said exothermic reaction chamber and having a plurality of openings through which said first fluid flows into the upstream end of said exothermic reaction chamber, and wherein each said reaction tube passes through the distribution member and is surrounded by a plurality of said openings that are closer to said reaction tube than the latter is to its nearest neighbor reaction tube.

2. An endothermic reaction apparatus as set forth in claim 1, wherein said first supply includes a first fluid plenum on the side of said distribution member opposite said exothermic reaction chamber.

3. An endothermic reaction apparatus as set forth in claim 2, wherein said second fluid outlet means includes a plurality of nozzle tubes projecting from said distribution member into said exothermic reaction chamber generally parallel to and laterally offset from said reaction tubes.

4. An endothermic reaction apparatus as set forth in claim 3, wherein said second supply includes a second fluid plenum to which said plurality of nozzle tubes are connected, said second fluid plenum being on the side of said first fluid plenum opposite said exothermic reaction chamber.

5. An endothermic reaction apparatus as set forth in claim 4, wherein said reaction tubes have downstream portions disposed downstream of said exothermic reaction chamber in the direction of flow of endothermic product to said outlet port, said first supply includes a plurality of first supply tubes through which said downstream portions of said reaction tubes coextend, said first supply tubes and downstream portions of said reaction tubes form therebetween first fluid flow passages in heat exchange relationship with said downstream portions of said reaction tubes, and said first fluid flow passages are connected to said first fluid plenum.

6. An endothermic reaction apparatus as set forth in claim 5, wherein said second supply includes a plurality of second supply tubes through which said first supply tubes respectively coextend, and said first and second supply tubes from therebetween respective second fluid flow passages in heat exchange relationship with said first fluid flow passages and said downstream portions of said reaction tubes, and said second fluid flow passages are connected to said second fluid plenum.

7. An endothermic reaction apparatus as set forth in claim 1, comprising means for causing the exothermic reaction products exiting from said exothermic reaction chamber to flow around and along upstream portions of said reaction tubes at a velocity substantially greater than the velocity of the exothermic reaction products through said exothermic reaction chamber to enhance heat transfer from said exothermic reaction products to said upstream portions of said reaction tubes for heating the endothermic reactant flowing through said upstream portions of said reaction tubes, said means for causing including a plurality of exhaust tubes through which said upstream portions of said reaction tubes respectively coextend, said exhaust tubes and respective upstream portions of said reaction tubes forming therebetween exhaust passages for the exothermic reaction products, and said exhaust tubes each having an inlet end portion configured to provide for a progressive increase of the flow velocity of the exothermic reaction products entering into said exhaust tube thereby to avoid excessive localized heat concentration in the respective reaction tube and said exhaust tube at the inlet end of said exhaust tube.

8. An endothermic reaction apparatus as set forth in 7, wherein said inlet portion of said exhaust tubes is radially outwardly flared thereby to provide for a progressive increase of the flow velocity of the exothermic reaction products through said flared inlet portion.

9. An endothermic reaction apparatus as set forth in claim 1, wherein said second fluid outlet means includes a plurality of nozzle tubes projecting into said exothermic reaction chamber generally parallel to and laterally offset from said reaction tubes.

10. An endothermic reaction apparatus as set forth in claim 9, wherein said second supply includes a plenum for said second fluid to which said plurality of nozzle tubes are connected.

11. An endothermic reaction apparatus as set forth in claim 9, wherein said reaction tubes each has a downstream portion disposed downstream of said exothermic reaction chamber in the direction of flow of endothermic product to said outlet port, said first supply includes a plurality of first supply tubes through which said downstream portions of said reaction tubes coextend, said first supply tubes and said reaction tubes from therebetween respective first fluid flow passages in heat exchange relationship with said downstream portions of said reaction tubes, said second supply includes a plurality of second supply tubes through which said first supply tubes respectively coextend, and said first and second supply tubes form therebetween respective second fluid flow passages in heat exchange relationship with said first fluid flow passages and said downstream portions of said reaction tubes.

12. An endothermic reaction apparatus as set forth in claim 1, including an endothermic reaction catalyst contained within said reaction tubes.

13. An endothermic reaction apparatus as set forth in claim 1, wherein said vessel includes an inlet manifold connected to said inlet port and an outlet manifold connected to said outlet port.

14. An endothermic reaction apparatus as set forth in claim 13, wherein said second fluid outlet means includes a plurality of nozzle tubes interposed among said reaction tubes for introducing said second fluid into said exothermic reaction chamber downstream of said first fluid outlet means.

15. An endothermic reaction apparatus as set forth in claim 14, wherein said nozzle tubes are substantially uniformly dispersed among said plurality of reaction tubes.

16. An endothermic reaction apparatus as set forth in claim 14, wherein said nozzle tubes have outlet ends oriented to direct the second fluid exiting therefrom in a direction substantially parallel to said reaction tubes.

17. An endothermic reaction apparatus as set forth in claim 14, wherein said flow distribution member is at a location upstream of the outlet ends of said nozzle tubes.

18. An endothermic reaction apparatus as set forth in claim 14, wherein said reaction tubes have downstream portions disposed downstream of said exothermic reaction chamber in the direction of flow of endothermic reactant and product through said reaction tubes, said first and second supplies include a plurality of supply tubes through which said downstream portions of said reaction tubes coextend, said supply tubes and downstream portions of said reaction tubes forming therebetween respective flow passage for said first and second fluids in heat exchange relationship with said downstream portions of said reaction tubes.

19. An endothermic reaction apparatus as set forth in claim 14, wherein said reaction tubes each have a downstream portion disposed downstream of said exothermic reaction chamber in the direction of flow of endothermic reactant and product through said reaction tube, and each one of said reaction tubes has associated therewith a pair of supply tubes including an inner tube through which said downstream portion of said reaction tube extends longitudinally and forms with said inner tube a first flow passage, and an outer tube through which said inner tube extends longitudinally and forms with said outer tube an outer flow passage, said inner and outer flow passages thereby being in heat exchange relationship with said downstream portion of said reaction tube.

20. An endothermic reaction apparatus as set forth in claim 19, wherein a plurality of said inner flow passages have outlet ends commonly connected to a first fluid plenum and a plurality of said outer flow passages have outlet ends commonly connected to a second fluid plenum.

21. An endothermic reaction apparatus as set forth in claim 20, wherein said flow distribution member includes a distribution plate forming one end of said first plenum and having said plurality of openings, and said nozzle tubes extend through said distribution plate for connection to said second fluid plenum.

22. An endothermic reaction apparatus as set forth in claim 14, wherein at least a plurality of said nozzle tubes have associated therewith a flow restricting orifice.

23. An endothermic reaction apparatus as set forth in claim 13, wherein said flow distribution member is at a location upstream of the outlet ends of said nozzle tubes.

24. An endothermic reaction apparatus as set forth in claim 23, wherein said reaction tubes have downstream end portions disposed downstream of said exothermic reaction chamber in the direction of flow of reactant and product through said reaction tubes, and wherein said first and second supplies include a plurality of supply tubes through which said downstream portions of said reaction tubes coextend, said supply tubes and downstream portions of said reaction tubes forming therebetween respective flow passages for said first and second fluids in heat exchange relationship with said downstream portions of said supply tubes.

25. An endothermic reaction apparatus as set forth in claim 13, wherein said reaction tubes are connected at opposite ends to respective tube sheets, and said inlet and outlet manifolds being disposed in said vessel for relative longitudinal movement for permitting collective expansion and contraction of said plurality of reaction tubes, and wherein each individual tube is connected at one end thereof by an expansion joint to one of said tube sheets to accommodate expansion and contraction of each individual tube relative to collective expansion and contraction of said plurality of reaction tubes.

26. An endothermic reaction apparatus as set forth in claim 25, wherein said expansion joint is a metal bellows.

27. An endothermic reaction apparatus as set forth in claim 26, wherein one of said inlet and outlet ports is connected to a respective one of said inlet and outlet manifolds by a metal bellows.

28. An endothermic reaction apparatus as set forth in claim 25, wherein one of said inlet and outlet ports is connected to a respective one of said inlet and outlet manifolds by a primary metal bellows, and said expansion joint for each said reaction tube includes a secondary metal bellows having an expansion/contraction range substantially less than the expansion/contraction range of said primary metal bellows.

29. An endothermic reaction apparatus as set forth in claim 28, wherein said secondary metal bellows for each reaction tube and said primary metal bellows are at opposite ends of said vessel.

* * * * *